US008855974B2

(12) United States Patent
Cho et al.

(10) Patent No.: US 8,855,974 B2
(45) Date of Patent: Oct. 7, 2014

(54) SYSTEM AND METHOD FOR RECOMMENDING SENSITIVE MAKE-UP BASED ON SKIN TONE OF USER

(75) Inventors: Maeng Sub Cho, Daejeon (KR); Soon Young Kwon, Daejeon (KR); Jin Seo Kim, Daejeon (KR); Song Woo Lee, Daejeon (KR); Juyeon You, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 333 days.

(21) Appl. No.: 13/292,312

(22) Filed: Nov. 9, 2011

(65) Prior Publication Data

US 2012/0123759 A1    May 17, 2012

(30) Foreign Application Priority Data

Nov. 12, 2010  (KR) ........................ 10-2010-0112729

(51) Int. Cl.
*G06F 17/50*     (2006.01)
*G06T 11/00*     (2006.01)
*G06T 19/20*     (2011.01)

(52) U.S. Cl.
CPC ................. *G06T 19/20* (2013.01); *G06T 11/00* (2013.01); *G06T 2219/2012* (2013.01)
USPC ........................................................... 703/2

(58) Field of Classification Search
CPC .......... G06T 11/00; G06T 19/20; G06F 17/50
USPC ...................... 703/2, 6; 348/47; 382/252, 279
See application file for complete search history.

(56) References Cited

U.S. PATENT DOCUMENTS

| 8,064,726 | B1 * | 11/2011 | d'Eon et al. | 382/279 |
| 8,538,183 | B1 * | 9/2013 | d'Eon et al. | 382/252 |
| 2004/0179013 | A1 * | 9/2004 | Menache | 345/473 |
| 2005/0135675 | A1 | 6/2005 | Chen et al. | |
| 2010/0226531 | A1 | 9/2010 | Goto | |
| 2011/0298897 | A1 * | 12/2011 | Sareen et al. | 348/47 |
| 2012/0086783 | A1 * | 4/2012 | Sareen | 348/47 |

FOREIGN PATENT DOCUMENTS

| JP | 2006-048393 A | 2/2006 |
| KR | 1020020034150 A | 5/2002 |
| KR | 1020030059685 A | 7/2003 |
| KR | 1020030091419 A | 12/2003 |
| KR | 1020040024118 A | 3/2004 |

(Continued)

OTHER PUBLICATIONS

Jeong-Sik Kim, et al; "A Virtual Environment for 3D Facial makeup", R Shumaker (Ed.): Virtual Reality, HCII 2007 LNCS 4563, pp. 488-496, 2007 (Exact Date Not Listed in Publication).

*Primary Examiner* — Thai Phan
(74) *Attorney, Agent, or Firm* — Ladas & Parry LLP

(57) ABSTRACT

A system for recommending a sensitive make-up based on skin tone of a user, includes an avatar creator for creating an avatar image using skin information obtained by scanning user's body. Further, the sensitive make-up recommending system includes a cosmetics information processor for generating analysis information by analyzing a plurality of cosmetics and then storing the generated information in a database. Furthermore, the sensitive make-up recommending system includes a simulator for displaying results of performing a make-up simulation to the avatar image based on the analysis information on certain cosmetics selected by the user and the skin information.

16 Claims, 2 Drawing Sheets

(56) References Cited

FOREIGN PATENT DOCUMENTS

| | | |
|---|---|---|
| KR | 20080086996 A | 9/2008 |
| KR | 20100047863 A | 5/2010 |
| WO | 01/04840 A1 | 1/2001 |
| WO | 2009/022631 A1 | 2/2009 |

* cited by examiner

SYSTEM AND METHOD FOR RECOMMENDING SENSITIVE MAKE-UP BASED ON SKIN TONE OF USER

CROSS-REFERENCE TO RELATED APPLICATION(S)

The present invention claims priority of Korean Patent Application No. 10-2011-0112729, filed on Nov. 12, 2010, which is incorporated herein by reference.

FIELD OF THE INVENTION

The present invention relates to a make-up recommending system; and more particularly, to a system for and a method of recommending make-up suitable for a user depending on situations by performing a realistic simulation based on information on skin tone of user's body.

BACKGROUND OF THE INVENTION

Users do not recognize the internet as a space from which to obtain information simply but as another world different from real world, and use the internet more and more. In this space, users begin to use other selves representing themselves, namely, avatars. Although IDs that are displayed simply by texts on a chatting window represent users themselves in early internet, realistic avatars such as pictures or three-dimensional (3D) models are used with demanding visual elements with the development of hardware and network infrastructures. A user selects one of several models that are provided in advance by a game developer in real gaming space and uses the selected model as his/her avatar by modifying the selected model in various manners to be suited to his/her favorite.

A system for recommending a make-up may be one of application technologies of using such an avatar.

A conventional system for recommending the make-up paints over an avatar image color corresponding to cosmetics and displays the painted avatar. The conventional make-up recommending system does not consider an interaction between cosmetics and skin at all and thus cannot reproduce color of cosmetics.

In addition, the conventional system for recommending the make-up does not consider changes of color of cosmetics and skin tone depending on lighting even though the color of the cosmetics and the skin tone are seen differently from the original ones depending on the change of the lighting.

Due to the reasons described above, existing simulations do not implement precise make-up simulation but only implement a simple function of applying a single product to all users in the same manner. Moreover, the existing simulations cannot determine user's features so that proper make-up style cannot be recommended but that advertising of their products is only promoted.

SUMMARY OF THE INVENTION

In view of the above, the present invention provides a system and method for recommending a sensitive make-up based on skin tone of a user, for reproducing realistic color in virtual space based on skin color of the user and analysis information of cosmetics and enabling realistic make-up and simulation by considering a relationship therebetween.

Further, the present invention provides the system and method for recommending the sensitive make-up based on the skin tone of the user, for sensing changes of color of cosmetics and skin tone depending on lighting to simulate the change of the colors and displaying the results using an avatar with the same image as the user.

In accordance a first aspect of the present invention, there is provided a system for recommending a sensitive make-up based on skin tone of a user, including: an avatar creator for creating an avatar image using skin information obtained by scanning user's body; a cosmetics information processor for generating analysis information by analyzing a plurality of cosmetics and then storing the generated information in a database; and a simulator for displaying results of performing a make-up simulation to the avatar image based on the analysis information on certain cosmetics selected by the user and the skin information.

In accordance a second aspect of the present invention, there is provided a method for recommending a sensitive make-up based on skin tone of a user, including: extracting skin information by scanning user's body and then creating an avatar image based on the extracted skin information; searching a database, in which analysis information of cosmetics are stored, based on the user skin information to select cosmetics suitable for the user; and displaying results of performing a make-up simulation to the avatar image based on the selected cosmetics and the skin information.

In accordance with the make-up recommending system of the embodiment of the present invention, cosmetics may be applied to the same 3D avatar image as a user before buying the cosmetics and suitable cosmetics may be recommended. Accordingly, unsuitable cosmetics may be avoided when buying cosmetics. Moreover, since the make-up recommending system in accordance with the present invention shows the results that new product is applied to a personal avatar, advertising customized to individuals may be enabled and the system may be utilized as a make-up simulator in films, plays, concerts, and the like.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Figure 1:
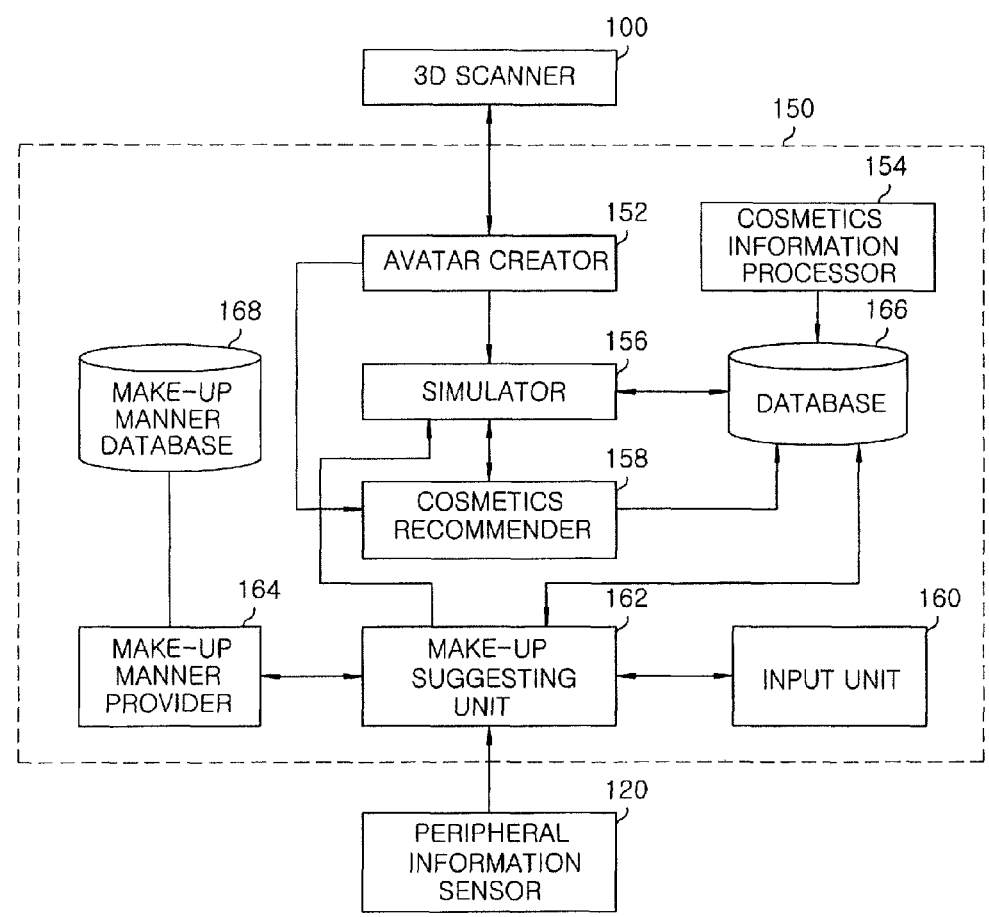
FIG. 1 is a block diagram illustrating a sensitive make-up recommending system in accordance with an embodiment of the present invention.

Embodiments of the present invention will be described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, an embodiment of the present invention will be described in detail with the accompanying drawings which form a part hereof.

FIG. 1 is a block diagram illustrating a sensitive make-up recommending system in accordance with an embodiment of the present invention. The inventive sensitive make-up recommending system includes a three-dimensional (3D) scanner 100, a make-up simulation unit 150, and a peripheral information sensor 120.

The make-up simulation unit 150 includes an avatar creator 152, a cosmetics information processor 154, a simulator 156, a cosmetics recommender 158, an input unit 160, a make-up suggesting unit 162, and a make-up manner provider 164.

The 3D scanner 100 provides skin information of enabling to scan user's body in 3D scale and to reproduce the scanned user's body in a virtual space to the make-up simulation unit 150. Here, the skin information may be sebum, pore, freckle, pigmentation, aged status, color, or the like of the skin.

The avatar creator 152 creates a 3D avatar image based on skin tone of a user using the data received from the scanner 100. Here, the 3D avatar may have the same skin color and the body line as those of the user.

The cosmetics information processor 154 obtains physical features of cosmetics, generates analysis information of the cosmetics for determining a relationship between color of the cosmetics and the skin of the user and information on changing pattern of color of the cosmetics depending on lighting for each of the cosmetics, and stores the generated information in the database 166. Here, the analysis information of the cosmetics may be hydrophilic property and lipophilicity which are obtained by measuring softness of a corresponding product and strength to be applied to the skin (e.g., by measuring oil and water ratio) using molecules, atomic structure, components, or the like as the physical features of cosmetics. Further, the information on the changing pattern may be information on changing pattern of the color of the cosmetics and the skin color under a specific lighting, which is obtained by determining color changing of cosmetics due to the lighting. Based on the analysis information, a realistic color of cosmetics may be reproduced in the virtual space.

The simulator 156 performs a make-up simulation to the user's 3D avatar. In other words, the simulator 156 displays the real make-up simulation result obtained by considering the relationship among skin status, skin color, the analysis information of cosmetics, color of cosmetics, lighting, or the like on a virtual screen.

In addition, the simulator 156 displays the results of performing the make-up simulation to the user's 3D avatar on the virtual screen, based on user information that is input from the input unit 160, the skin status, and the skin color as well as the skin status, the analysis information of cosmetics, the color of cosmetics, and the lighting.

Further, the simulator 156 shows the simulated results in 3D manner and provide an interface such that the user can rotate, enlarge/scale down, and move his/her avatar.

The input unit 160 provides an interface for inputting user information such as user's favorite for color, situation, age, or the like.

The make-up suggesting unit 162 may display the user information input through the input unit 160 and a result screen obtained by searching the database 166 for a pre-stored cosmetics list suitable for fashion and seasons and then applying respective cosmetics within the cosmetics list that is searched for to the user's avatar image in conjunction with the simulator 156, that is, make-up style on the virtual screen.

The make-up manner provider 164 provides information on the cosmetics and make-up manner which are applied to the corresponding make-up style when one of make-up styles is selected. In other words, the make-up manner provider 164 provides the user with information of the cosmetics applied to the corresponding make-up style on make-up manner by searching the make-up manner database 168 for the same.

The cosmetics recommender 158 searches the database 166 for cosmetics suitable for the user based on the information on the user's skin and the make-up manner database 168 for make-up manner for the suitable cosmetics, and provides the searched cosmetics and make-up manner to the user.

The peripheral information sensor 120 senses information on the environment around the user, for example, lighting color, weather information, and the like, and provide the same to the simulator 156.

Now, an operation process of the sensitive make-up recommending system based on an avatar image in accordance with the embodiment of the present invention having the foregoing configuration will be described with reference to FIG. 2.

Figure 2:
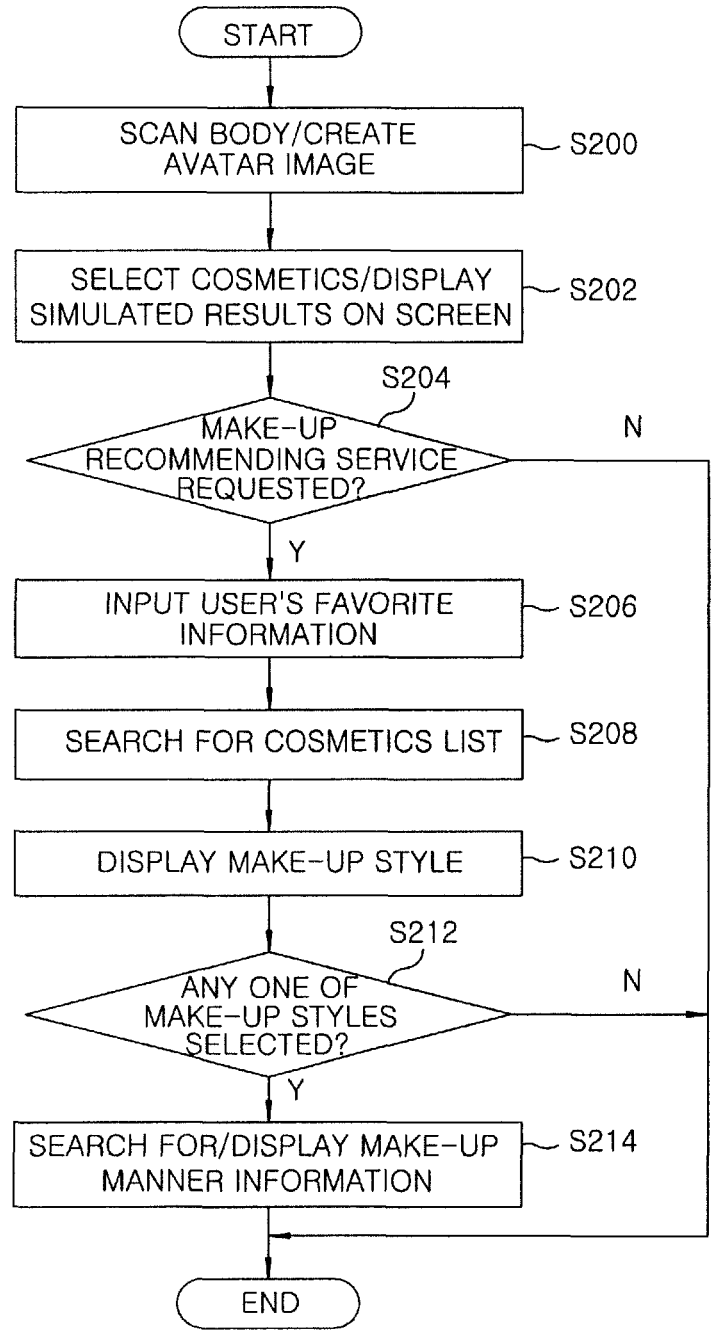
FIG. 2 is a flow chart illustrating a process of recommending make-up suitable for a user in accordance with the embodiment of the present invention.

FIG. 2 is a flow chart illustrating a process of recommending make-up suitable for a user in accordance with the embodiment of the present invention.

As shown in FIG. 2, first, the 3D scanner 100 scans a user's body to generate data on the scanned user's body and provides the generated data to the avatar creator 152. And then, the avatar creator 152 creates a 3D avatar image based on user color sense using the data in step S200. That is, the avatar creator 152 creates a 3D avatar image having the same skin color and body line as those of the user.

Next, the simulator 156 extracts cosmetics suitable for the user's skin color by searching the database 166 and then provides an interface that can select at least one of the extracted cosmetics. When at least one of the cosmetics is selected through the interface, the simulation result screen in which the cosmetics are applied to the 3D avatar image based on the selected cosmetics and the skin color of the user is displayed in step S202.

In this case, the simulator 156 displays the simulation result screen by referring to peripheral information on the user that is received from the peripheral information sensor 120. For example, the simulator 156 displays the 3D avatar image to which the cosmetics are applied based on information on lighting around the user.

Meanwhile, when a user's make-up recommending service is selected in step S204, the make-up suggesting unit 162 provides an interface that can input user's favorite information through the input unit 160, and searches the database 166 for a cosmetics list suitable for the user based on the user's favorite information that is input through the interface, pre-stored fashion information, season information, user skin information, or the like in steps S206 and S208.

The make-up suggesting unit 162 displays the simulation result in which the respective cosmetics within the cosmetics list searched under the control of the simulator 156 are applied to the user's 3D avatar image, that is, the make-up styles to which the respective cosmetics are applied on the virtual screen in step S210.

Thereafter, when the user selects any one of the make-up styles in step S212, the make-up suggesting unit 162 may search the make-up manner database 168 for make-up manner information on cosmetics contained in the selected make-up style under the control of the make-up manner provider 164 and then display the searched make-up manner information in step S214.

Further, the make-up recommending system may provide cosmetics suitable for the user based on the information on the user skin using the cosmetics recommender 158. In other words, the cosmetics recommender 158 may extract cosmetics suitable for the user by searching the database 166 based on the information on the user skin and provide the extracted cosmetics to the user.

In addition, when the make-up recommending system in accordance with the embodiment of the present invention receives information on new cosmetics, the cosmetics information processor 154 may create analysis information of the new cosmetics and pattern information on color change caused by change of lighting and then register the new cosmetics in the database 166 using the created information.

While the invention has been shown and described with respect to the embodiments, it will be understood by those skilled in the art that various changes and modifications may be made without departing from the scope of the invention as defined in the following claims.

What is claimed is:

1. A system for recommending a sensitive make-up based on skin tone of a user, comprising:
    an avatar creator for creating an avatar image using skin information obtained by scanning user's body;
    a cosmetics information processor for generating analysis information by analyzing a plurality of cosmetics and determining a relationship between colors of the plurality of cosmetics and a user's skin tone and wherein the generated analysis information includes information on changing patterns of the colors of the cosmetics depending on lighting for each of the cosmetics, and then storing the generated analysis information in a database;
    a peripheral information sensor that senses information on an environment around the user to generate sensing information;
    and
    a simulator for displaying results of performing a make-up simulation to the avatar image based on the sensing information, the skin information and the generated analysis information on certain cosmetics selected by the user and the skin information.

2. The system of claim 1, wherein the cosmetics information processor analyzes pattern information of color change of each of the cosmetics caused by change of lighting and stores the pattern information in the database, the system further comprising a peripheral information sensor for sensing an environment around the user to generate sensing information, wherein the simulator displays results of performing a make-up simulation to the avatar image based on the sensing information received from the peripheral information sensor, the analysis information, and the skin information when the certain cosmetics are selected.

3. The system of claim 1, wherein the avatar creator creates the avatar image using information on the user's body that is generated by scanning the user's body and the skin information.

4. The system of claim 1, further comprising a cosmetics recommender for recommending a cosmetics list suitable for the user by searching the database based on the skin information, wherein the simulator applies cosmetics selected from the cosmetics list by the user to the avatar image of the user.

5. The system of claim 1, further comprising:
    an input unit for providing an interface for inputting information on the user; and
    a make-up suggesting unit for searching the database for the user information input from the input unit and a cosmetics list suitable for pre-stored fashion and season, and then applying each of cosmetics within the searched cosmetics list to the avatar image.

6. The system of claim 5, further comprising:
    a make-up manner database on which information on make-up manner of each of the cosmetics that are stored in the database is stored; and
    a make-up manner provider for searching the make-up manner database, when the user selects any one of the avatar images provided by the make-up suggesting unit, based on the cosmetics which are applied to the selected avatar image, to thereby provide make-up manner information.

7. A method for recommending a sensitive make-up based on skin tone of a user, comprising:
    extracting skin information by scanning the user's body and then creating an avatar image based on the extracted skin information;
    sensing information on an environment around the user to generate sensing information;

generating analysis information of cosmetics selected by the user and determining the relationship between the color of the selected cosmetics and the user's skin tone and information on changing patterns of the color of the selected cosmetics depending on lighting for each of the selected cosmetics;

searching a database, in which analysis information of cosmetics are stored, based on the user's skin information to select cosmetics suitable for the user; and displaying results of performing a make-up simulation to the avatar image based on the analysis information of the selected cosmetics, the information on the environment around the user, the selected cosmetics and the skin information.

8. The method of claim 7, further comprising:
providing an interface of selecting at least one of the cosmetics stored in the database; and
displaying results of performing a make-up simulation to the avatar image based on the cosmetics selected through the interface and the skin information.

9. The method of claim 7, wherein said creating the avatar image further includes: extracting body information by scanning the user's body; and creating the avatar image based on the body information and the skin information.

10. The method of claim 7, further comprising: when information on new cosmetics is received, generating analysis information on the new cosmetics by using the received information; and registering the new cosmetics in the database by using the generated analysis information.

11. The method of claim 7, wherein the database stores pattern information of color change of each of the cosmetics depending on change of a lighting, wherein said displaying the results of performing the make-up simulation to the avatar image includes:
receiving information on an environment around the user; and
displaying the results of performing the make-up simulation to the avatar image based on the environment information, the skin information, and the analysis information of cosmetics.

12. The method of claim 7, further comprising:
providing an interface of inputting information about the user; searching the database for at least one of cosmetics suitable for the user based on the user information, and predetermined fashion and season information; and
applying each of the searched cosmetics to the avatar image to provide a make-up style for each of the searched cosmetics.

13. The method of claim 12, further comprising:
providing a make-up manner database on which information on make-up manner is stored, each of the cosmetics being stored in the database; and
when any one of make-up styles is selected, searching the make-up manner database based on the cosmetics which are applied to the selected make-up style to thereby provide make-up manner information suitable for the user.

14. A system for recommending a sensitive make-up based on skin tone of a user, comprising:
an avatar creator for creating an avatar image using skin information obtained by scanning user's body, wherein the skin information is at least one of sebum, pore, freckle, pigmentation, and aged status;
a peripheral information sensor that senses information on a user's environment and generates sensing information;
a cosmetics information processor for generating analysis information by analyzing a plurality of cosmetics and determining a relationship between colors of the plurality of cosmetics and a user's skin tone and wherein the generated analysis information includes information on changing patterns of the colors of the cosmetics depending on lighting for each of the cosmetics; and
a simulator for displaying results of performing a make-up simulation to the avatar image based on the analysis information, the skin information, and the information on the environment around the user.

15. The system of claim 14 wherein the analysis information includes at least one of hydrophilic property and lipophilicity.

16. The system of claim 14 wherein the hydrophilic property and lipophilicity are determined by measuring softness of a corresponding product and strength to be applied to the skin using at least one of molecules, atomic structure, and components as the physical feature.

* * * * *